United States Patent [19]

Yu

[11] Patent Number: 5,431,360
[45] Date of Patent: Jul. 11, 1995

[54] AIRPLANE PASSENGER SEAT

[76] Inventor: Jian K. Yu, 46 Rui Jin Bei Zhun #508, Nanjing (210016), China

[21] Appl. No.: 171,912

[22] Filed: Dec. 21, 1993

[30] Foreign Application Priority Data

Dec. 21, 1992 [CN] China ............... ZL922 37970 X

[51] Int. Cl.⁶ .............................................. B64D 11/06
[52] U.S. Cl. .............................. 244/122 R; 244/118.6; 297/337; 105/345
[58] Field of Search ............ 244/122 R, 118.5, 118.6; 297/337, 118; 105/345

[56] References Cited

U.S. PATENT DOCUMENTS

| | | | |
|---|---|---|---|
| 1,557,587 | 10/1925 | Hodgson | 105/345 |
| 2,280,065 | 4/1942 | Roude | 244/118.6 |
| 2,433,950 | 1/1948 | Henderson | 244/122 R |
| 2,606,727 | 7/1947 | De Haven | |
| 2,682,931 | 3/1950 | Young | |
| 4,091,740 | 5/1978 | Lie | |
| 4,150,805 | 4/1979 | Mazelsky | |
| 4,349,167 | 9/1982 | Reilly | |
| 4,487,383 | 12/1984 | Mazelsky | |
| 4,799,632 | 1/1989 | Baymak et al. | 244/122 R |
| 4,824,173 | 4/1989 | Tomita | 297/337 |
| 4,944,554 | 7/1990 | Gross et al. | 297/337 |
| 5,152,578 | 10/1992 | Kiguchi | |
| 5,333,818 | 8/1994 | Brandt et al. | 244/122 R |

*Primary Examiner*—Galen L. Barefoot
*Attorney, Agent, or Firm*—Price, Gess & Ubell

[57] ABSTRACT

An airplane seat that affords extra protection for a passenger is provided. The seat has a slidingly mounted seat bottom that can slide from a front side of the seat back to a rear side of the seat back. In this way a single seat can provide a safer, rear-facing seat for use during take-off, landings and any emergency situations as well as a conventional front-facing seat for use during normal flight. The sliding of the seat bottom is automatic and is powered by the airplane through either electric motors or hydraulic/pneumatic cylinders. For additional passenger protection the legs of the seat are equipped with a shock absorbing system.

20 Claims, 2 Drawing Sheets

AIRPLANE PASSENGER SEAT

BACKGROUND OF THE INVENTION

1. Field of the Invention

The present invention relates to seats for use in passenger-carrying airplanes. In particular, the invention relates to a passenger seat that provides enhanced passenger safety by automatically switching from a forward-facing to a rearward-facing configuration.

2. Description of Related Art

Although civilian aviation has attained a remarkable level of safety, there is still a considerable effort to reduce the level of passenger injury from infrequent poor landings and other mishaps. Not surprisingly, much of this effort has revolved about the design of the passenger seat. The passengers spend most of their flying time in seats; therefore, they are likely to be seated when any accident occurs.

One manner of creating a safer or "crash-resistant" seat is to construct the seat with energy-absorbing components. In this way the seat can absorb much of the destructive energy of a crash rather than transmitting it to the seat occupant. U.S. Pat. No. 2,682,931 to Young teaches an airplane seat that is mounted on an energy-absorbing link to attenuate the transmission of injury-causing energy from a crash landing. U.S. Pat. No. 4,150,805 to Mazelsky provides a bucket seat that is linked to a mounting frame by a plurality of energy absorbers. U.S. Pat. No. 4,349,167 to Reilly teaches a crash-resistant passenger seat which is pivotally mounted to the floor of the aircraft by a plurality of wire-bending energy attenuators. The seat can be mounted to face either forward or backward. U.S. Pat. No. 5,152,578 to Kiguchi teaches a seat that is pivotally mounted with the mounting being bridged by a diagonally-mounted energy absorber.

The art has also recognized the advantages of mounting a passenger seat so that the passengers face the rear of the aircraft. Because most of the force during an improper landing tends to propel the passengers towards the front of the aircraft, this orientation allows the seat back to absorb these forces and protect the passenger. U.S. Pat. No. 2,606,727 to De Haven teaches a rearward-facing passenger seat mounted in an energy-absorbing frame that extends to the ceiling of the aircraft. U.S. Pat. No. 4,487,383 to Mazelsky teaches a rearward-facing seat pivotally mounted on a plurality of energy-absorbing members.

A major problem with the prior art has been the excessive complexity of the energy-absorbing systems. The energy absorbers can be greatly simplified in a rearward-facing seat system because in that orientation the seat body itself provides considerable protection to the occupant. However, rearward-facing seats are not popular, particularly because many individuals become motion sick when riding in a rearward-facing seat.

OBJECTS AND SUMMARY OF THE INVENTION

In keeping with the above explanation, it is an object of the present invention to provide a crash-resistant passenger seat that combines the advantages of energy-absorbing seats and rearward-facing seats.

It is a further object of this invention to provide a seat which can provide maximum protection in times of risk such as airplane take-off or landing, either normal or abnormal.

It is also an object of the present invention to avoid the passenger discomfort of a rearward-facing seat by providing a forward-facing seat for use except at times of enhanced risk.

The present invention attains its objects by providing an energy-absorbing seat system which faces rearward during times of risk but faces forward during times of normal flight. This is achieved by a seat in which the seat bottom is mounted on a track system. The seat bottom can slide forwards or backwards relative to the seat back. When the seat bottom slides backwards, it provides a rearward-facing seat. When there is little risk of aircraft impact, the seat bottom can be slid forward to provide a conventional forward-facing seat. Normally the movement of the seat bottom is under automatic control and the power for the motion is provided by the aircraft. Alternatively, the seat can be released and moved by human power under emergency conditions or whenever the seat movement mechanism fails.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, because the generic principles of the present invention have been defined herein specifically as a crash-resistant airplane seat in which the seat bottom transits relative to the seat back to provide either a rearward-facing or a forward-facing passenger seat.

Currently, all the normal passenger seats of a civilian airplane are forward-facing. As mentioned above, this orientation agrees with the physiological habits of most people. Most of us are used to riding in a forward-facing direction in cars and buses. Consequently, we are used to seeing where we are going and are unhappy facing away from the direction of travel. Furthermore, many people develop motion sickness if forced to travel in a rearward-facing position for a prolonged time. Although motion sickness is more common in children, an appreciable number of adults also suffer this malady. Unfortunately, a forward-facing seat is far from ideal for protecting its occupant from the forces of an accidental landing.

When an airplane suffers an accidental landing, the aircraft suddenly decelerates. Objects, like passengers, that are not part of the craft continue to move forward due to inertia. If the passengers are not restrained, they can be injured by striking the walls or ceiling of the airplane. If they are seated in a conventional seat with a fastened seat belt, they will not go flying about the cabin, but the seat belt may also injure them as it places tremendous force on soft portions of the human anatomy. In addition, the passenger may face injury as the force of the crash is transmitted to the passengers through the floor of the cabin.

Although a rearward-facing seat does not please most people, it does provide superior protection during a sudden impact. Instead of the passenger being restrained by a single belt, the entire seat back provides restraint and, hence, distributes the force of impact over a larger area. If the legs of the seat are provided with an energy-absorbing mechanism, the passenger is further protected, since the transmission of shock waves from the cabin floor is limited.

Figure 1:
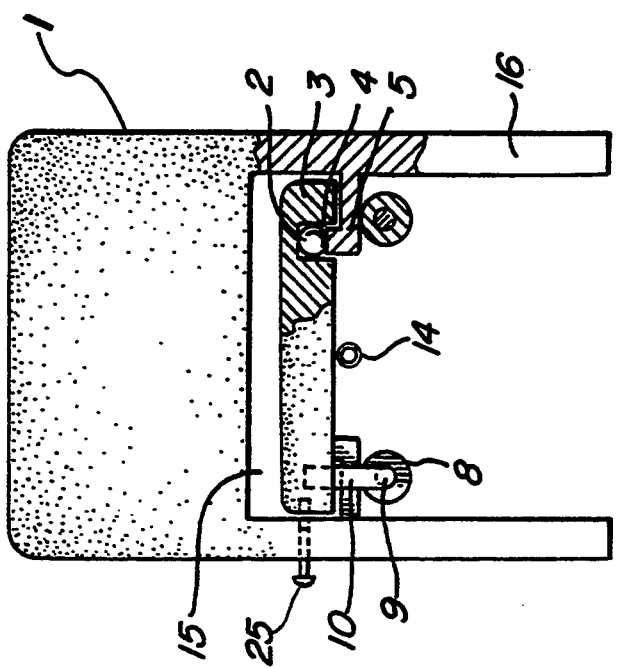
FIG. 1 is a schematic side view of an embodiment of the present invention that uses cylinders as a motive force.

Safety considerations have prompted some suggestion of switching civilian airplane seating to a rearward-facing configuration. The present invention provides the advantages of rearward-facing seating during times of likely impact with the advantages of forwardfacing seating during normal flight. As shown in FIG. 1, the seat structure is relatively conventional with a seat back 1 supported by front legs 6 and rear legs 16. Pivot 20 is provided to allow seat back 1 to recline towards the rear for increased passenger comfort. A seat bottom 3 is supported by a seat support 5 which is attached to the seat back 1 and legs 6, 16. A track system 4 (shown in dotted lines) is embedded in the seat bottom 3 to allow the seat bottom 3 to slide to a forward-facing or rearward-facing side of seat back 1. Ball bearings 2 are an integral part of track system 4 and are intended to reduce the friction of seat bottom motion. Of course, other friction-reducing arrangements such as flat or roller bearing surfaces are also usable in the present invention.

Figure 2:
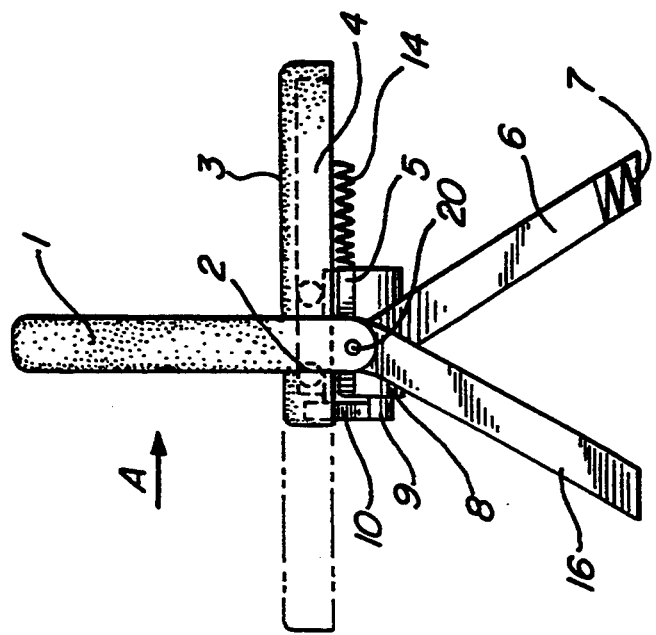
FIG. 2 is a rear view (from the perspective of point A) of the embodiment of FIG. 1.

FIG. 2 shows that seat bottom 3 fits within a passageway 15 created by seat back 1 on the top and legs 6, 16 on the side. This allows the seat bottom 3 to move from the rearward-side of seat back 1 where it provides a rearward-facing passenger seat to the forward-side of seat back 1 where it provides a forward-facing passenger seat. Motive power for the movement of the seat bottom 3 is provided by hydraulic or pneumatic cylinders or by a motor.

In FIGS. 1 and 2 the cylinder embodiment is shown. Cylinder 8 is mounted beneath the seat support attached either to the support or to the seat legs. Depending on the strength and configuration of the cylinder, a seat may have one or two cylinders. The cylinders are of a typical piston in a cylinder design and are powered either by compressed air or hydraulic fluid provided by the airplane engines. A rod 9 is attached to the piston of the cylinder and a pin 10 is connected to the rod 9. The pin 10 is connected to the seat bottom 3 so that when the rod 9 is either extended from the cylinder or withdrawn into the cylinder, the seat bottom 3 will follow by sliding on track mechanism 4.

The cylinders may have dual inputs so that air or fluid will cause the rod to either extend or withdraw, or a pair of single input cylinders may be oriented in opposing directions so that one cylinder causes rearward motion of the seat bottom and the other cylinder causes forward motion of the seat bottom. Alternatively, the cylinders may be arranged to cause seat bottom motion in one direction only. In that case, spring 14 is provided to return the seat bottom 3 to the starting position when air or hydraulic power is not applied. As explained above, a rearward-facing seat is preferred for an emergency situation where an impact is likely. Therefore, the default position when no power is applied to the cylinders is with the seat bottom 3 on the rearward-facing side of seat back 1. This position is maintained by spring 14. Only when power is applied to the seat will the rod 9 extend and move the seat back 3 to the forward seating position. Manual retainer 25 is provided for use when the motive system fails to maintain the seat bottom 3 in the forward position. The passenger on the rear side of the seat pushes the seat bottom 3 forward against the spring 14. When the seat bottom 3 has been pushed completely forward, the passenger engages the retainer 25 allowing a spring-loaded rod to extend into seat bottom 3 and lock it in the forward position.

Figure 4:
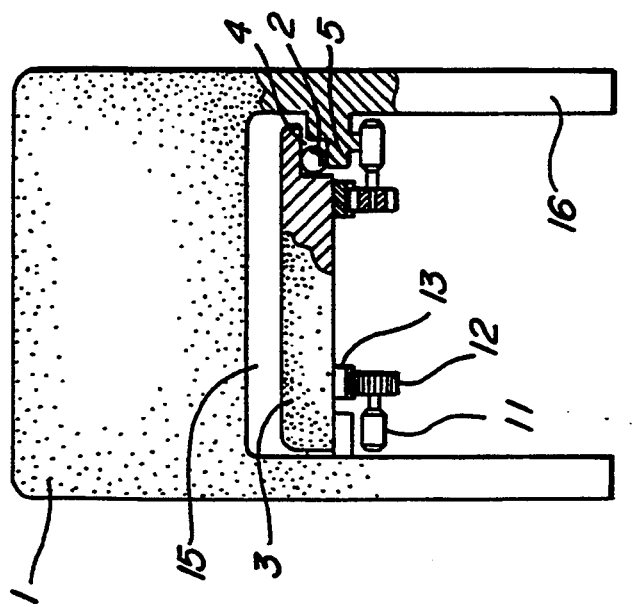
FIG. 4 is a rear view (from the perspective of point B) of the embodiment of FIG. 3.
Figure 3:
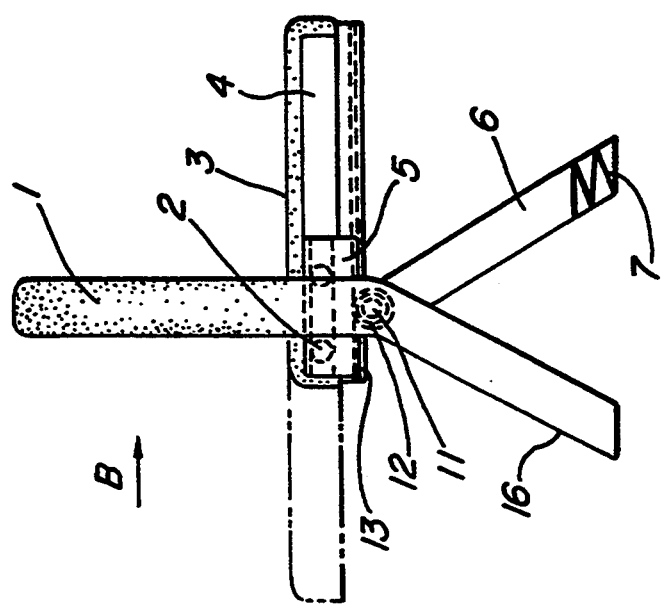
FIG. 3 is a schematic side view of an embodiment of the present invention that uses a motor with a rack and pinion as a motive force.

FIGS. 3 and 4 show an alternate embodiment where motive power is supplied by a motor 11. This motor has a pinion gear 12 mated to rack 13 which is attached to seat bottom 3. Thus, when pinion gear 12 is rotated by the motor, the seat bottom 3 slides forward or rearward on track system 4. The preferred motor is an electric motor, although pneumatic or hydraulic motors can also be used. As is the case with the motive cylinders (FIGS. 1 and 2), the motor can be used to drive the seat bottom in both directions, or spring 14 (not shown) can drive the seat to the rearward position when power is not applied to the motor. For spring 14 to operate properly the motor 11 must rotate easily when no power is applied. Because it is not always possible to ensure that the motor will rotate freely (particularly in the case of fluid driven motors), the rack and pinion system of FIGS. 2 and 3 works best where the motor 11 is used both to drive the seat bottom 4 rearward as well as forward.

In normal operation the seat bottom 3 would be in its rearmost position when passengers enter the airplane. This is to permit the passengers to face towards the rear of the plane during take-off, a time of increased risk of crash. Passengers in the first row of seats are seated on rear-facing seats that fold down from the front cabin wall. After take-off a signal is given, and all the passengers stand momentarily. The seat bottoms 3 then slide through the seat backs 1 to provide forward-facing seats. The passengers turn about and then sit down in the preferred forward-facing orientation. Passengers in the front row of seats sit on the seats of the present invention and the rear-facing fold-down cabin wall seats are returned to their stowed position. Passengers in the last row sit on seats that fold down from the rear wall of the cabin. During emergencies or during normal landings the procedure is reversed so that all the passengers are protected by rearward-facing seats.

The front legs 6 are on shock absorbers 7 to absorb impact in the case of an accident. As already explained, the major forces during an impact will be provided by the inertial tendency of the seats and passengers to continue to move forward. When the airplane stops suddenly on impact, the difference in motion between the cabin floor and the seat legs is taken up by the shock 10 absorbers 7. The preferred absorbers are high tension coefficient spring absorbers that will not deform during normal operation. It requires a force of about 500 kilograms to deform the shock absorbers of the preferred embodiment. Other shock absorbers, such as hydraulic cylinder-type absorbers with similar deformation properties, may also be used.

Those skilled in the art will appreciate that various adaptations and modifications of the just-described preferred embodiments can be configured without departing from the scope and the spirit of the invention. Therefore, it is to be understood that the invention may be practiced other than as specifically described herein without departing from the scope of the appended claims.

What is claimed is:

1. A passenger seat for use in an airplane, the seat enhances passenger safety by providing forward-facing seating for a passenger during flight and rearward-facing seating for a passenger during take-offs and landings, the seat comprising:
   front legs for supporting the seat and for attaching the seat to a cabin floor of the airplane;
   rear legs for supporting the seat and for attaching the seat to the cabin floor of the airplane;
   shock absorbing means for absorbing a shock of impact that is transmitted through the front legs;
   a seat back attached to the legs for horizontal support of the passenger;
   a seat support attached to the legs;
   a seat bottom for vertical support of the passenger, the seat bottom supported by the seat support;
   track means for sliding the seat bottom on the seat support;
   a passageway through the seat back, the passageway sized to fit the seat bottom so that the seat bottom can slide on the track means from a forward-facing to a rearward-facing side of the seat back; and
   driving means for driving the sliding of the seat bottom.

2. The passenger seat of claim 1, wherein the track means further comprises ball bearings to reduce the friction of sliding the seat bottom.

3. The passenger seat of claim 1, wherein the track means further comprises a sliding bearing surface to reduce the friction of sliding the seat bottom.

4. The passenger seat of claim 1, which further comprises pivot means for attaching the seat back to the legs so that the seat back can recline during flight of the airplane.

5. The passenger seat of claim 1, wherein the driver means comprises:
   a pneumatic cylinder for providing motive force to slide the seat bottom when activated by pneumatic power;
   a rod moving in response to the pneumatic cylinder; and
   a pin attaching the rod to the seat bottom so that the seat bottom slides in response to activation of the pneumatic cylinder.

6. The passenger seat of claim 5, wherein the driver means further comprises a spring attached to the seat bottom and seat support in opposition to the pneumatic cylinder so that the seat bottom will slide to its rearward position when pneumatic power is not applied to the cylinder.

7. The passenger seat of claim 1, wherein the driver means comprises:
   a hydraulic cylinder for providing motive force to slide the seat bottom when activated by hydraulic power;
   a rod moving in response to the hydraulic cylinder; and
   a pin attaching the rod to the seat bottom so that the seat bottom slides in response to activation of the hydraulic cylinder.

8. The passenger seat of claim 7, wherein the driver means further comprises a spring attached to the seat bottom and seat support in opposition to the hydraulic cylinder so that the seat bottom will slide to its rearward position when hydraulic power is not applied to the cylinder.

9. The passenger seat of claim 1, wherein the driver means comprises:
   a motor for producing rotary motion when activated by power;
   a pinion gear attached to a shaft of the motor; and
   a rack attached to the seat bottom with the pinion gear fitting the rack so that rotation of the motor causes the seat bottom to slide on the track means.

10. The passenger seat of claim 9, wherein the motor is selected from a group comprising an electric motor, a pneumatic motor and a hydraulic motor.

11. The passenger seat of claim 9, further comprising a spring attached to the seat bottom and seat support in opposition to the rack so that the seat bottom will slide to its rearward position when power is not applied to the motor.

12. The passenger seat of claim 1, wherein the shock absorbing means comprises spring shock absorbers.

13. The passenger seat of claim 1, wherein the shock absorbing means comprises hydraulic shock absorbers.

14. The passenger seat of claim 1, wherein the shock absorbing means comprises a combination of spring and hydraulic shock absorbers.

15. A passenger seat for use in an airplane, the passenger seat enhancing passenger safety by providing forward-facing seating for a passenger during flight and rearward-facing seating for a passenger during take-offs and landings, the seat comprising:
   legs for supporting the seat and attaching the seat to a cabin floor of the airplane;
   a seat back attached to the legs for horizontal support of the passenger;
   a seat support attached to the legs;
   a seat bottom for vertical support of the passenger, the seat bottom supported by the seat support;
   track means for sliding the seat bottom on the seat support;
   a passageway through the seat back, the passageway sized to fit the seat bottom so that the seat bottom can slide from a forward-facing to a rearward-facing side of the seat back; and
   driving means for driving the sliding of the seat bottom.

16. The passenger seat of claim 15 further comprising shock absorbing means for absorbing shock of impact, the shock absorbing means connected to the legs and to the cabin floor.

17. A reversible seat, the seat alternately providing forward-facing seating for an occupant and rearward-facing seating for an occupant, the seat comprising:
   legs for supporting the seat and attaching the seat to a floor;
   a seat back attached to the legs for horizontal support of the occupant;
   a seat bottom for vertical support of the occupant;
   sliding means for retaining the seat bottom and for sliding the seat bottom in a horizontal direction;

a passageway through the seat back, the passageway sized to fit the seat bottom so that the seat bottom can slide from a forward-facing to a rearward-facing side of the seat back; and driving means for driving the seat bottom in the horizontal direction.

18. The reversible seat of claim 17, wherein the driving means comprise force applied to the seat bottom by a human being.

19. The reversible seat of claim 17, wherein the driver means comprises:

a hydraulic cylinder for providing motive force to slide the seat bottom when activated by hydraulic power;

a rod moving in response to the hydraulic cylinder; and a pin attaching the rod to the seat bottom so that the seat bottom slides in response to activation of the hydraulic cylinder.

20. The reversible seat of claim 17, wherein the driver means comprises:

an electric motor for producing rotary motion when activated by electric power;

a pinion gear attached to a shaft of the motor; and a rack attached to the seat bottom with the pinion gear fitting the rack so that rotation of the motor causes the seat bottom to slide.

* * * * *